H. A. NESS.
ATTACHMENT FOR MOTOR VEHICLES.
APPLICATION FILED DEC. 11, 1911.
1,029,763.
Patented June 18, 1912.
2 SHEETS—SHEET 2.
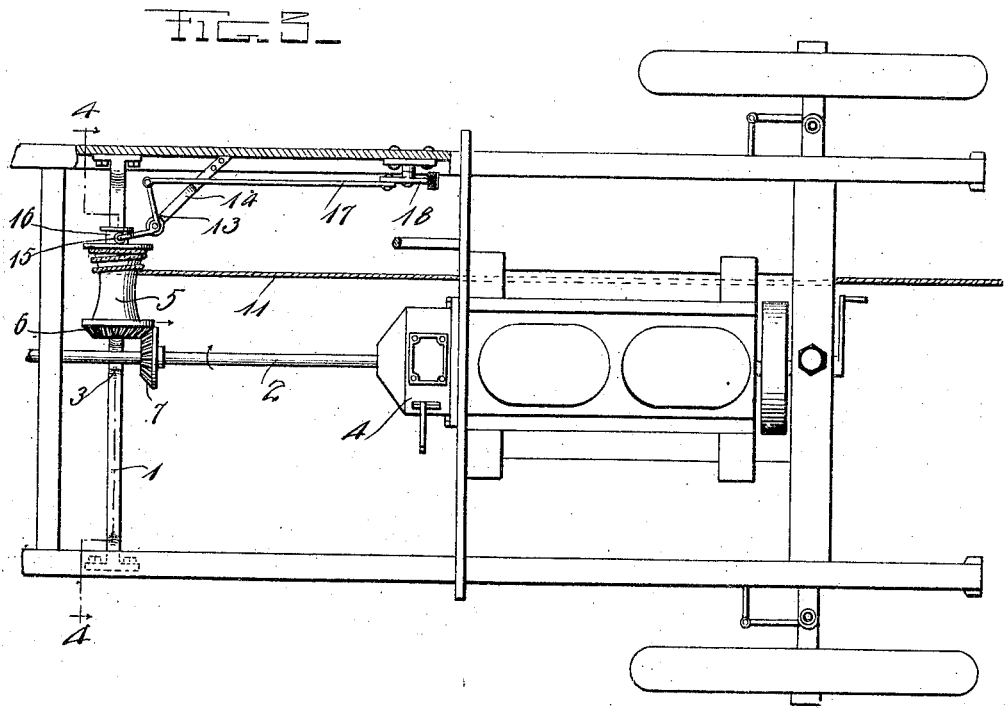
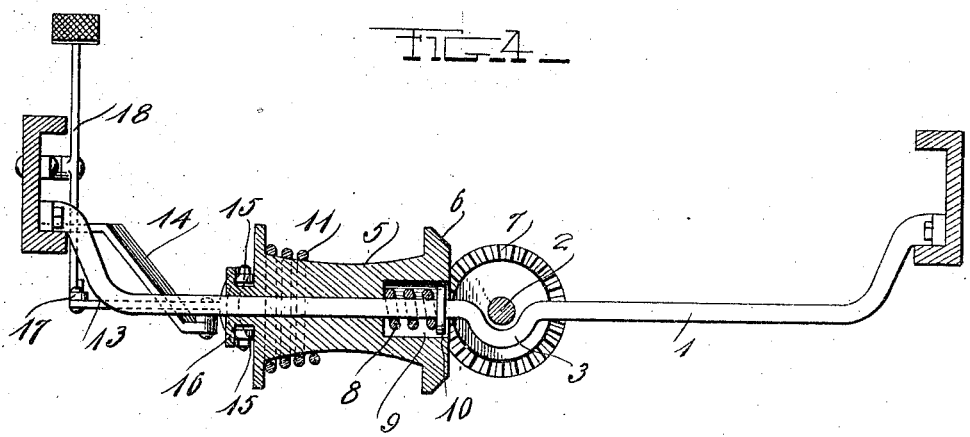
Witnesses
J. R. Pierce
C. E. Hunt
Inventor
H. A. Ness.
by H. B. Willson & Co.
Attorneys

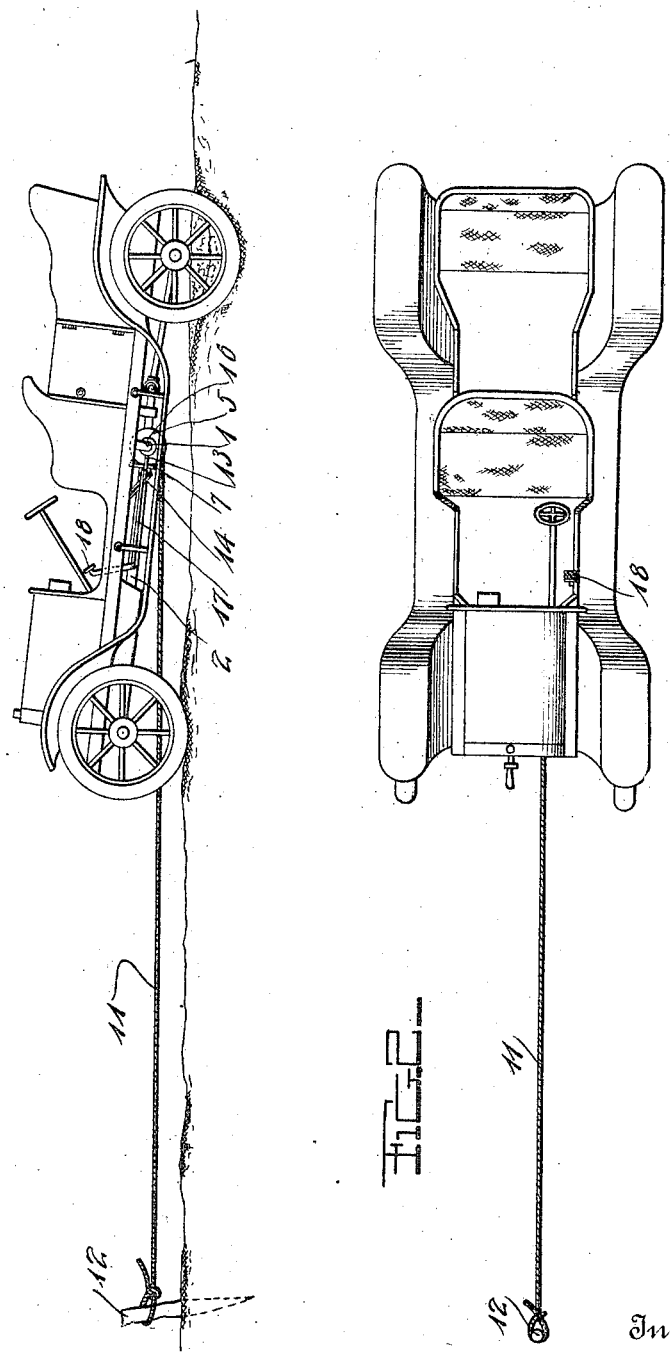

_UNITED STATES PATENT OFFICE._

HERBERT ANTON NESS, OF SILVERTON, OREGON.

ATTACHMENT FOR MOTOR-VEHICLES.

1,029,763.  Specification of Letters Patent.  Patented June 18, 1912.

Application filed December 11, 1911. Serial No. 665,173.

*To all whom it may concern:*

Be it known that I, HERBERT ANTON NESS, a citizen of the United States, residing at Silverton, in the county of Marion and State of Oregon, have invented certain new and useful Improvements in Attachments for Motor-Vehicles; and I do declare the following to be a full, clear, and exact description of the invention, such as will enable others skilled in the art to which it appertains to make and use the same.

This invention relates to attachments for motor vehicles.

One object of the invention is to provide a device of this character adapted to be applied to a motor vehicle whereby the power of the motor which drives the vehicle may be applied for pulling the latter out of the mud or out of a hole or ditch.

Another object is to provide an attachment of this character which will be simple and inexpensive in construction, efficient and reliable in operation and having means whereby the same may be readily thrown into and out of operation by the occupant of the vehicle.

With these and other objects in view, the invention consists of certain novel features of construction, and the combination and arrangement of parts as will be more fully described and claimed.

In the accompanying drawings: Figure 1 is a side view of an automobile showing the application of the invention; Fig. 2 is a plan view of the same; Fig. 3 is an enlarged plan view of a portion of the running gear of an automobile illustrating more clearly the construction and arrangement of the attachment and showing the parts engaged for operation. Fig. 4 is an enlarged vertical sectional view of the same on the line 4—4 of Fig. 3.

By reference to the accompanying drawing, it will be seen that the attachment comprises a shaft 1 which is preferably arranged below the rear portion of the vehicle body and transversely across the running gear, said shaft having its ends curved upwardly and bolted or otherwise rigidly secured to the side bars of the frame or running gear of the vehicle as clearly shown in Figs. 3 and 4 of the drawing. The shaft 1 is disposed in the same horizontal plane as the motor shaft 2 of the vehicle and at the point where the shaft 1 crosses the motor shaft 2. Said shaft 1 is depressed or has formed therein a curvature 3 to permit the same to pass beneath the motor shaft. The shaft 1 is disposed a suitable distance in rear of the motor 4 of the vehicle and has loosely mounted thereon a winding drum 5, said drum having on one end an annular series of beveled or other suitably formed teeth 6 adapted to be engaged with the similar teeth of a gear 7 fixedly mounted on the adjacent portion of the shaft 2 of the motor 4 of the vehicle. The drum 5 is disengaged from and is normally held out of engagement with the gear 7 by a coiled spring 8 which is arranged on the shaft 1 and in a recess or socket 9 formed in the end of the drum as shown. The spring 8 when thus arranged is disposed between the inner end of the socket or recess 9 and a stop collar 10 fixed on the shaft 1 whereby the pressure of the spring is exerted to force the drum away from the shaft 2 thus disengaging the teeth 6 from the gear 7.

Adapted to be wound on the drum 5 is a strong draft cable 11 which extends forwardly beneath the vehicle and is adapted to be secured to a stake 12 driven a suitable distance in advance of the machine as shown in Figs. 1 and 2 of the drawings or the outer end of the cable may if desired be secured to a tree, telegraph pole or other fixed object whereby when the inner end of the cable is wound on the drum the vehicle will be drawn forwardly out of the mud or hole in which the same may have become stuck.

In order to shift the drum 5 to bring the teeth 6 thereon into operative engagement with the gear 7 on the drive shaft 2 of the motor, I provide a bell crank shifting lever 13 which is pivotally mounted on a bearing bracket 14 secured to the frame of the vehicle as clearly shown in Figs. 3 and 4 of the drawing. The drum engaging arm of the lever 13 is preferably bifurcated and in the bifurcated ends of the arm are revolubly mounted antifriction rollers 15 which are engaged with a flanged extension 16 formed on the outer end of the drum as shown. To the opposite arm of the bell crank lever 13 is pivotally connected an operating rod 17 which extends forwardly and is pivotally connected to the lower end of a foot lever or treadle 18 pivotally mounted in the frame of the vehicle and projecting up through the bottom thereof in convenient reach of the foot of the operator whereby the operating rod 17 and the bell crank lever may be readily operated to shift the drum 5 into engagement with the gear 7 on the motor shaft whereby the drum will be revolved in the proper direction for winding up the cable and thus drawing the vehicle forwardly out of the mud or hole.

By means of an attachment constructed in accordance with my invention, when a vehicle has become stuck in the mud or in a hole, it is simply necessary for the operator to drive the stake 12 at a suitable distance from the machine and to attach the outer end of the cable 11 thereto or to some other fixed object. After thus securing the outer end of the cable the operator may get into the vehicle and by depressing the treadle 18 throw the winding drum into operative engagement with the driving mechanism as hereinbefore stated whereupon when the motor is started the cable will be wound on the drum and the vehicle thus pulled forwardly by its own driving mechanism.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A device of the character described comprising the motor shaft, a bevel gear fixed thereon, a shaft at a right angle to and in the same horizontal plane as the motor shaft secured at its ends and downwardly curved to pass by the motor shaft, a drum loosely mounted on the curved shaft provided at one end with bevel gear teeth to engage the teeth of the bevel gear on the motor shaft, said drum having also a recess in the toothed end surrounding its shaft, a spring coiled around said shaft in said recess, a collar fixed on said shaft affording a resistance to cause said spring to normally hold the drum teeth out of mesh with the bevel gear, and means, operable by the driver, to slide the drum, against the resistance of the spring, into engagement with the bevel gear on the motor shaft.

In testimony whereof I have hereunto set my hand in presence of two subscribing witnesses.

HERBERT ANTON NESS.

Witnesses:
JOHN N. KOLOEN,
J. E. HOSMER.

---

Copies of this patent may be obtained for five cents each, by addressing the "Commissioner of Patents, Washington, D. C."